(12) United States Patent
Berens

(10) Patent No.: US 6,881,887 B2
(45) Date of Patent: Apr. 19, 2005

(54) TEACHING METHOD AND GUIDES TO TEACH PIANO

(76) Inventor: Christopher P. Berens, 201 SW. 1$^{st}$ St., No. 2, Boca Raton, FL (US) 33432

( * ) Notice: Subject to any disclaimer, the term of this patent is extended or adjusted under 35 U.S.C. 154(b) by 0 days.

(21) Appl. No.: 10/881,586

(22) Filed: Jun. 30, 2004

(65) Prior Publication Data

US 2005/0016359 A1 Jan. 27, 2005

Related U.S. Application Data

(63) Continuation-in-part of application No. 10/444,779, filed on May 23, 2003.

(51) Int. Cl.$^7$ ............................................. G09B 15/08
(52) U.S. Cl. ..................... 84/478; 84/477 R; 84/479 A; 84/483.1; 84/483.2; 84/485 R; 84/470 R
(58) Field of Search ............................. 84/478, 477 R, 84/479 A, 483.1, 483.2, 485 R, 470 R

(56) References Cited

U.S. PATENT DOCUMENTS

| | | | | |
|---|---|---|---|---|
| 2,347,950 A | * | 5/1944 | Huish | 84/478 |
| 5,574,238 A | * | 11/1996 | Mencher | 84/483.2 |
| 2003/0000364 A1 | * | 1/2003 | Deverich | 84/47 |

* cited by examiner

*Primary Examiner*—Shih-Yung Hsieh
(74) *Attorney, Agent, or Firm*—Frank J. Benasutti

(57) ABSTRACT

A guide is disclosed with vertical numerically color coded lines on it. The guide can then be moved along the space between the keys and the fallboard of the piano, so that the keys can be played by anyone placing their fingers on the keys indicated by the lines on the guide.

Sheet music is prepared with numbers and colors juxtaposed to the notes corresponding to the lines, so that the piano student will know which keys to stroke.

2 Claims, 3 Drawing Sheets

*FIG. 2*

TEACHING METHOD AND GUIDES TO TEACH PIANO

CROSS REFERENCE TO RELATED APPLICATION

This application is a continuation-in-part of my prior co-pending application Ser. No. 10/444,779 filed May 23, 2003 entitled "Teaching method and template to make a guide to teach piano", the disclosure of which is incorporated herein by reference as if fully set forth.

BACKGROUND OF THE INVENTION

This invention relates to a method of teaching piano by the use of guides.

BACKGROUND ART

For years, piano teachers have sought to create ways to make it easier for students to learn the correlation between the sheet music and playing the keys which will produce the music. This has led them to develop music aids for the learning process, which seek to reduce the complexity of the piano by introducing physical devices in that process. For example, U.S. Pat. No. 4,444,083 teaches the use of templates that are placed over piano keys as an aid in learning how to play. See FIG. 1 of this patent. U.S. Pat. No. 4,361,070 teaches placing cover strips over keys with display elements on the keys to teach students to play the keyboard. U.S. Pat. No. 5,254,008 teaches overlays on piano keys as a device for learning music. The covered overlay on the keyboard enables one to visualize, but not play the piano. U.S. Pat. No. 5,574,238 teaches a musical notation for keyboard instruments where a mark is placed on the keys.

Musical slide rules have also been designed, such as in U.S. Pat. No. 5,524,522 and U.S. Pat. No. 3,678,796. These are not placed on the keyboard, but do show scales. Thus, they are designed to teach a relationship between the board and scales. These are not users' tools in the sense that they do not teach people how to play.

U.S. Pat. No. 2,347,950 discloses a chart for teaching the piano that goes behind the keyboard. Fingers from the chart come out over the white keys and are colored to correspond to colored notes in the music.

SUMMARY OF THE INVENTION

I have invented a guide with numbered colored coded lines which can placed and moved along the space between the keys and the fallboard of the piano, so that the scales can be played by anyone placing their fingers on the keys opposite to the numbered lines of the scales.

The numbers and colors on the guide correspond to colored numbers superimposed on and juxtaposed to notes sheet music.

The purpose of the numerically colored coded guide and corresponding coded sheet music is to create a teaching method. The purpose of the method is to enable a piano student to play entire sheets of music right away.

The way in which this works is by visual markers, rather than cognitive processes. The guide uses markers that point to the keys to be played. The numbers on the sheet music tell the student which notes to play; with which hand. This enables the student to play immediately. The student will now be able to play regardless of being able to read music or understand higher musical structures. It enables the student to enjoy learning rather than learning being such a complex task.

The method will also enable students to start piano lessons at a much earlier age. This method will aid greatly in strengthening fingers and developing the ear. It will instill knowledge of scale and chord structures both in a concrete and abstract manner.

The guide method allows the student, of any age, to play piano quickly and easily. This increases motivation and enthusiasm to continue learning how to play piano. The guide/sheet music method is a teaching and learning tool.

BRIEF DESCRIPTION OF DRAWINGS

FIG. 2 is a sheet of music prepared in accordance with my invention; and

DESCRIPTION OF THE PREFERRED EMBODIMENTS

I have created guides and a method that will enable a piano student to play scales and intervals. Using my method, a student (child or adult), may be able to play music within minutes of being introduced to this method.

A standard piano is made up of 88 keys. On most pianos there are 52 white keys and 36 black keys. The keys on the piano appear as if the white key is larger than the black key. The white key does have more surface area than the black key. The key centers of every key is actually equal in its spacing from the next key. The center of one note is as far away as the center of the next. For example, this space from note center to note center is normally approximately $9/16^{th}$ of an inch.

Music uses the first 7 letters of the alphabet to describe the pitches (tones) that may be played at any given time during a musical composition. The letters A, B, C, D, E, F and G represent all white notes of the piano keyboard. The black notes are named a little differently. First of all they are called accidentals and can be described as being sharp (raised) or flat (lowered). When a note is either sharp or flat it is described as the letter name of whatever white note was raised or lowered. The main point of this explanation is that there are 12 different tones in a complete chromatic scale. At the $13^{th}$ note of that chromatic scale (playing every note in immediate succession of the previous and not skipping over any notes) is the first note repeated one octave higher.

Figure 1:
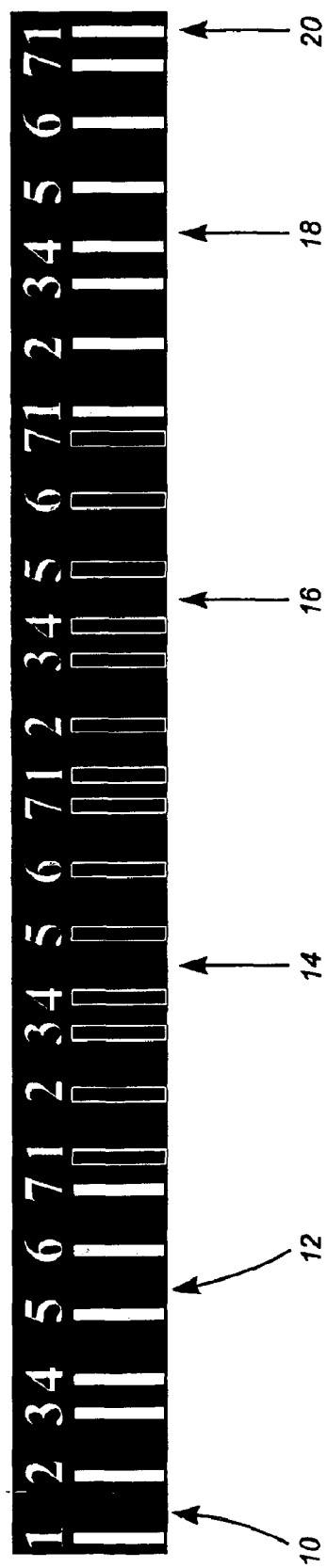
FIG. 1 is a plan view of a guide in accordance with my invention.

The guide 10, FIG. 1, is preferably constructed of heavy paper stock, approximately 3×27 inches. The guide consists of, for example, four octaves of a major scale. These are shown as four sets of vertical stripes 12, 14, 16 and 18. Each set is a different color—blue, red, green and orange, respectively. The last stripe, 20, is yellow. Each octave set has seven stripes numbered consecutively from one to seven, representing the individual scale degree tones for each octave.

Figure 3:
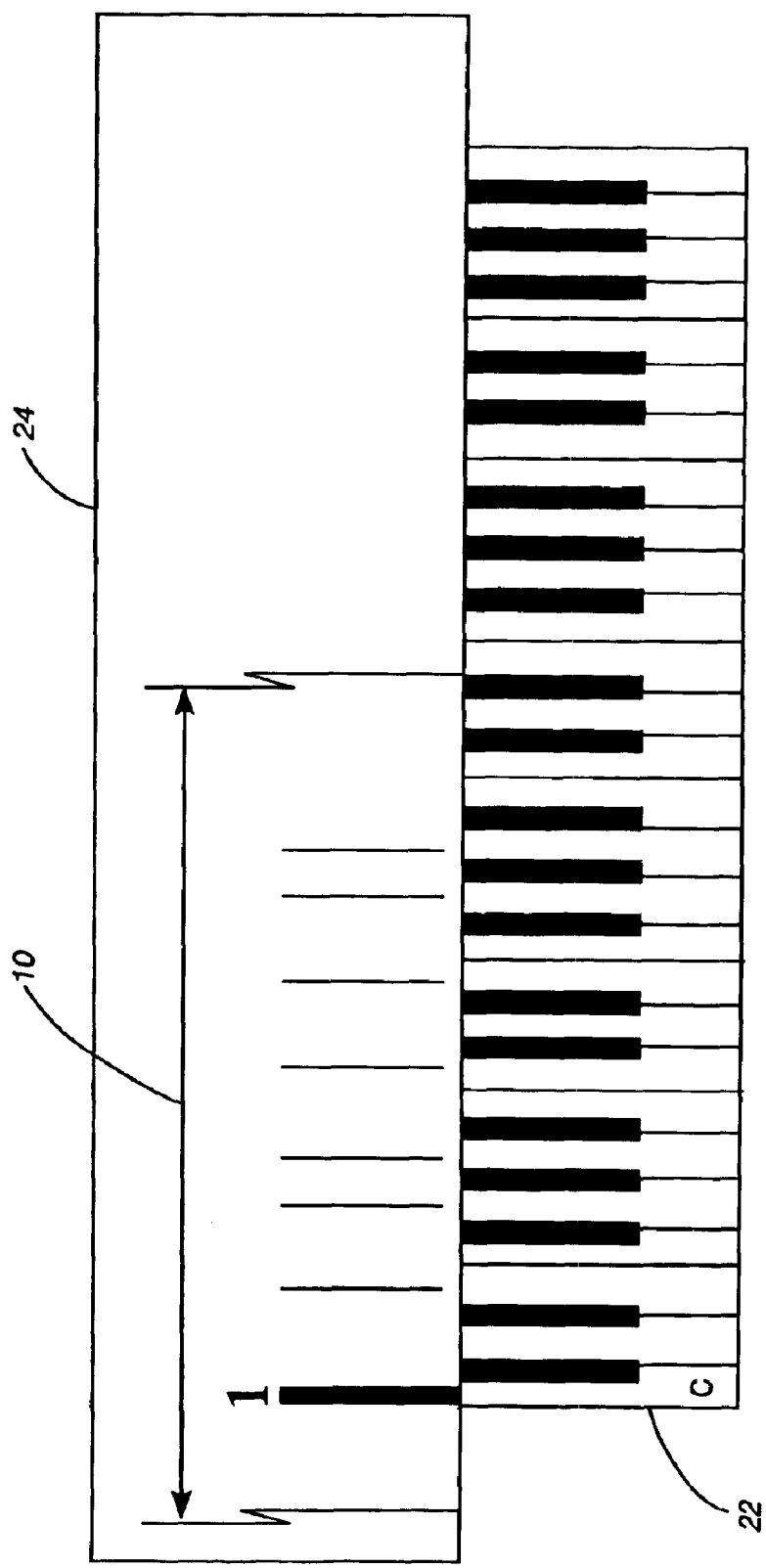
FIG. 3 is a diagram showing placement of the guide in relation to a piano keyboard.

The way a standard piano is constructed is with the keys 22, FIG. 3 (the black and white notes) arranged flat. The fallboard 24 FIG. 3, is the key cover that sits at the back of the keyboard and is usually at a 90 degree angle to the keyboard when it is open. There is a small space between the fallboard and the keyboard where the paper guide 10 can be placed and moved to the right or left by sliding. By placing this guide up against the fallboard, it will be completely visible as well as completely out of the way of the hands of the player.

Musical structures such as scales, chords, intervals, etc. are fixed structures in a sense. A major scale for instance, has the same intervallic structure from key to key. If a vocalist sings Do Re Mi Fa Sol La Ti Do (solfeggio) in the key of C it would still be the same song as if that vocalist sang it in the keys of D, E, F, G, etc. The structure of that song, no matter what key it is in, remains unchanged.

As far as fixed structures are concerned, the same thing goes for intervals and scales. They all have specific fixed mathematical structures that can be replicated. One is then able to easily map the musical structure and use it as a guide that indicates which notes to play by the use of visual cues. Because of the fact that these structures are, in essence, fixed equations, they can be used in a chromatic manner on the keyboard.

The first step in using this guide and method is to construct sheet music with corresponding numerically color coded notes. Referring to FIG. 2, for example, the sheet music for the work "Silent Night" has been marked up with colored numbers placed next to the notes of the standard music notation. The upper scale is for use by the right hand and the lower scale is for use by the left hand. The red numbers correspond to the red numbered lines on the guide.

The guide will be placed on the piano as recommended for individual piece according to the harmonic key of the piece. For example, the work shown is to be played in middle "C". The teacher would instruct the student to take the guide 10 and place it against the fallboard. Slide the guide until the first red "1" and red line (corresponding to the first red note "1" on the first lower scale 30, FIG. 2) is aligned with the middle "C" key on the piano. This key can be found to the left of the pair of black keys as shown in FIG. 3. It is understood that the student would have to be instructed as to what key that was on the piano, and that is normally done by the piano teacher in the first instance.

The guide can be shifted, and the "1" can be realigned in order to extend the scale beyond one octave. Thus, the guide would now have two octaves. Repeat this process for more octaves.

To play other major scales, the student need only slide the guide to the right or left to any particular other lettered key and then play by numbered-colored line again.

The number above each line functions to line up with a note.

In the case of accidentals (sharps, flats and naturals) that may not be represented by a number directly, the two numbers on both sides will be notated. Thus, where the designated note is found on the keyboard in between the lines, I have noted this by placing the numbers in close proximity with a line in between them. See the blue numbers "5" and "6" with the line 32 in between at the end of the first lower scale in FIG. 2. The user will then play the note that falls between the numbers and lines 5 and 6.

I have invented a guide/sheet music means for use in providing a guide for piano players to guide them in selecting piano keys to be stroked. This means comprising a guide having a plurality of strips or lines spaced from one another at intervals selected to correspond to the intervals existing from one piano key. These lines are both numbered and colored. The numbers and colors are referenced on the sheet music.

Thus, I have also described a method of teaching piano comprising the steps of making a guide comprising a plurality of vertical lines thereon and placing the guide in juxtaposition with the keys of the piano so that the piano player can play those keys identified by the numeric, colored lines corresponding to the numeric, colored notes identified on the sheet music.

What is claimed is:

1. A guide/sheet music means for use in creating a guide for piano players to guide them in selecting piano keys to be stroked; said guide/sheet music means comprising a guide having a plurality of numerically identified colored lines spaced from one another at intervals selected to correspond to the intervals existing from one piano key to another piano key; and at least one sheet of music having the notes identified with numbers and colors corresponding to the numbers and colors of the guide.

2. A method of teaching piano comprising the steps of making a guide comprising a plurality of vertical, numbered colored lines and placing the guide in juxtaposition with the keys of the piano so that the piano player can play those keys identified by the lines; and making sheet music with numbered colored notes corresponding to the lines so that the piano player can play those keys identified by the numbered notes.

* * * * *